3,309,663
TURN SIGNAL SYSTEM WITH AUTOMATIC
CANCELING MEANS
Edward G. Curtindale, Saginaw, Mich., assignor to General Motors Corporation, Detroit, Mich., a corporation of Delaware
Filed June 3, 1964, Ser. No. 372,214
5 Claims. (Cl. 340—55)

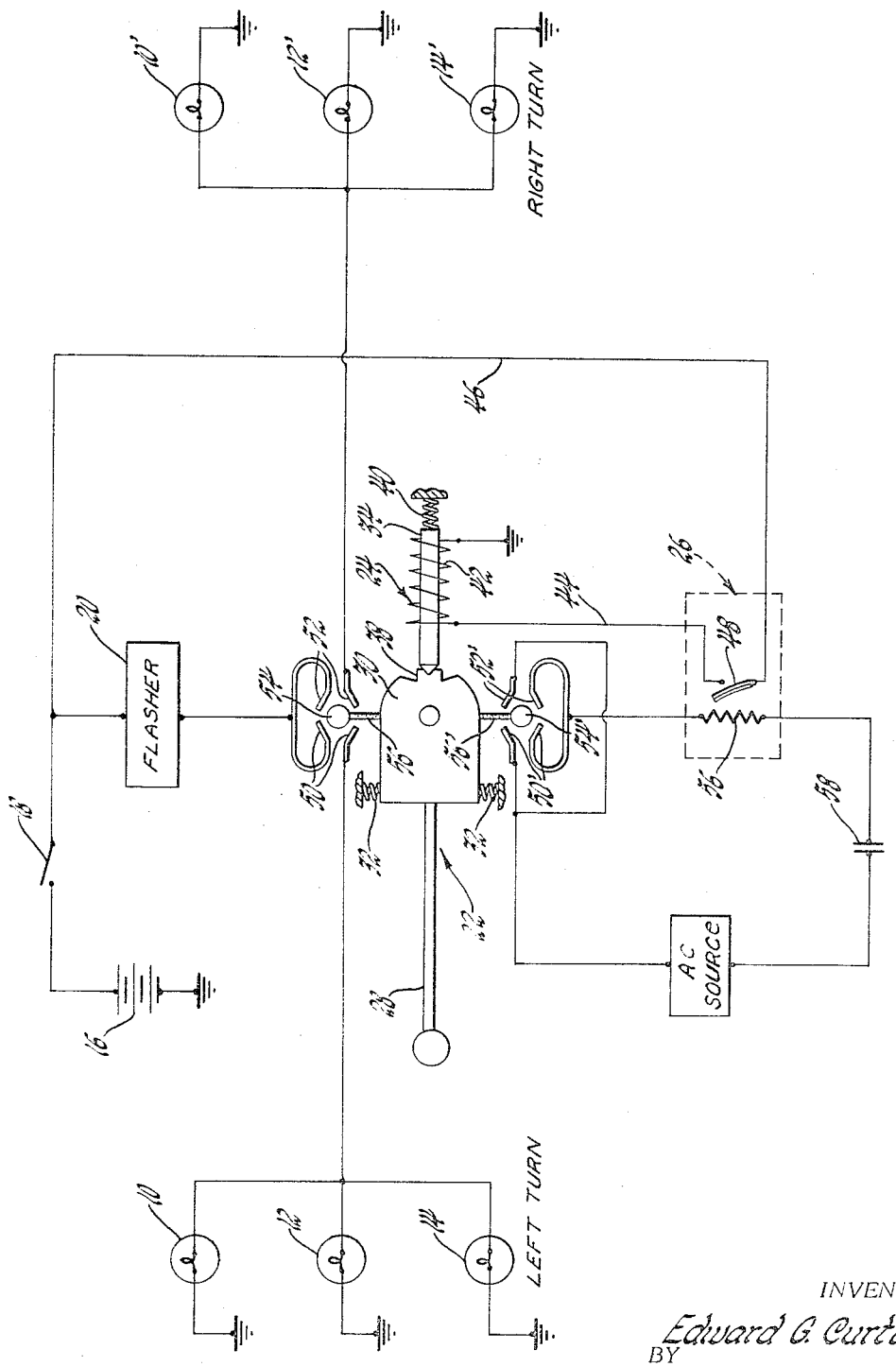

This invention relates in general to electrical control circuits and more particularly to an electrical control circuit for controlling energization of motor vehicle turn indicator lamps.

One of the primary disadvantages of the turn signal systems of the prior art is the manner in which the turn signal is canceled after the turn is made. Conventionally, a mechanical canceling system is employed which is mounted in a suitable manner to the vehicle steering shaft or steering wheel and adapted to return the turn signal actuator to a neutral position if the steering wheel is rotated sufficiently to turn the vehicle through an arc of approximately 90°. It will be apparent that under various driving conditions this type of mechanical cancellation is ineffective. In particular when an automobile is traveling in a multilane superhighway and has occasion to either turn therefrom or to change lanes thereon, the turns are generally of a small magnitude and it is quite likely that a mechanical canceling device would not be rotated sufficiently to deenergize the system.

In accordance with the present invention, a turn signal system is provided which incorporates canceling means adapted to independently deenergize the system under predetermined conditions. More particularly, the present invention provides a turn signaling system incorporating means for deenergizing the turn signal after a predetermined time interval with the time interval being a function of the speed of the vehicle.

A more complete understanding of the present invention may be had from the following detailed description which should be read in conjunction with the drawing in which the figure is a circuit diagram of a turn signaling system having means for automatically canceling the system in accordance with the principles of the invention.

Referring now to the drawing, left and right indicator lamps 10, 12, 14 and 10', 12' and 14' respectively are adapted to be selectively energized from a source 16 through an ignition switch 18 and a flasher 20 by a turn signal mechanism generally designated 22. The mechanism 22 is manually operable to either left or right turn indicating position and is releasably maintained in either the neutral or turn indicating position by a solenoid generally designated 24. The solenoid 24 is normally deenergized when the mechanism 22 is in a neutral position but is adapted to be connected across the source 16 when the turn signal mechanism 22 is actuated to either a left or right turn indicating position by means of the condition responsive switch generally designated 26.

The turn signaling mechanism 22 comprises a lever 28 adapted to manually move a lever assembly 30 against the bias of springs 32 from a neutral position as shown to either a left or right turn indicating position in which position the lever assembly 30 is releasably maintained by engagement of the plunger 34 of the solenoid 24 with the notches 38 formed in the lever assembly 30. A spring 40 exerts a sufficient force on the plunger 34 to retain the lever assembly 30 in either a left or right turn indicating position against the force of the spring 32. This arrangement acts as a mechanical detent allowing the lever 28 to be manually moved to any position with no electrical power being required for holding the lever 28 in a selected position. It will be noted that the solenoid winding 42 has one end connected to the battery 16 through conductors 44 and 46 and a bi-metal strip 48. The other end of the solenoid is connected to ground. It will be apparent that energization of the solenoid 24 causes the plunger 34 to be moved rightward out of the notches 38 of the lever assembly 30 in which it was engaged. This releases the lever assembly 30 and the springs 32 will return the assembly 30 to a neutral position as shown.

A pair of stationary contacts 50 and 52 are adapted to be bridged by movable contact 54 which is carried by an insulating arm 56 attached to the lever 28 to connect the left or right turn indicating lamp to the flasher 20. Similarly, stationary contacts 50' and 52' are adapted to be bridged by the movable contact 54'. A series circuit including a resistor 56 of the bi-metal switch 26 and a capacitor 58 are adapted to be connected across an A.C. source by movement of the movable contact 54' to a position where it bridges either the contacts 50' or 52'. The alternating current input is obtained by one phase of a three phase alternator installed on the vehicle. The rotating part of the alternator is driven from the motor vehicle engine and thus provides an output, the frequency of which is a function of the r.p.m. of the engine and consequently the speed of the vehicle.

Operation

If the driver wishes to indicate a left turn, the lever 28 is moved in a counterclockwise direction connecting the left turn indicating lamps 10, 12 and 14 with the battery 16 through a movable contact 54, stationary contacts 50 and the flasher 20 thereby providing an intermittent energization of the lamps 10, 12 and 14. Simultaneously with closing of the contacts 50 is the closing of stationary contacts 52' by movable contact 54' which connects the A.C. source across the capacitor 58 and the resistor 56 of bi-metal switch 26. It will be understood that the time required to cause the bi-metal strip 48 to close the circuit between conductors 44 and 46 is dependent upon the energy dissipated in the heater resistor 56 which is a function of the current flowing therethrough. It will also be understood that the impedance of the capacitor 58 is inversely related to the frequency of the A.C. source. Therefore, the time required for the bi-metal strip 48 to connect the solenoid 24 to the source 16 is inversely proportional to the frequency of the applied A.C. voltage or the speed of the vehicle. Thus the time interval between turn indication and cancellation is dependent on the speed of the vehicle. In other words when the vehicle is traveling at high speeds a shorter time elapses before the indicating lamps are canceled than when the vehicle is traveling at low speed.

If the driver were to indicate a right turn, the contacts 52 and 50' are closed by movement of the lever 28 in a clockwise direction thus intermittently energizing lamps 10', 12' and 14'. The system then operates in the same manner as previously described.

It will be understood that the lever 28 may be moved manually at any time to any position to override any automatic action which may have started and reset the entire mechanism.

While the invention has been described with respect to a particular embodiment, it is not to be construed in a limiting sense. Many modifications and variations will now occur to those skilled in the art. For a definition of the invention, reference is made to the appended claims.

I claim:

1. In a motor vehicle having a source of alternating current of variable frequency depending upon the speed of the vehicle, a turn signal system comprising actuator means, indicator means, means for intermittently energizing said indicator means in response to actuation of said actuator means, canceling means for deenergizing said indicator means, frequency responsive time delay means adapted to be connected to said source in response to actuation of said actuator means for controlling the operation of said canceling means whereby said indicating means are deenergized after a time interval dependent on the speed of the vehicle.

2. In a motor vehicle having a source of alternating current of variable frequency depending upon the speed of the vehicle, a turn signal system comprising actuator means, indicator means, means for intermittently energizing said indicator means in response to movement of said actuator means from a neutral position to an actuated position, electromechanical detent means for releasably maintaining said actuator means in an operative position, time delay means adapted to be connected to said source in response to movement of said actuator means from a neutral position to an operative position, said time delay means including switching means adapted to energize said detent means after an interval of time dependent on the speed of the vehicle, energization of said detent means permitting said actuator means to return to a neutral position thereby extinguishing said indicator means.

3. A motor vehicle turn signal system comprising indicating means, actuating means adapted to be moved from a neutral position to an operative position for intermittently energizing said indicator means, means including electromechanically operated means for returning said actuator means from an actuated position to a neutral position, time delay means adapted to be connected to a source of alternating current, the frequency of which is related to the speed of the vehicle, said time delay means including a resistor and a capacitor, bi-metal switching means responsive to the heat produced by current flow through said resistor for connecting said electromechanical detent means across a source of the direct current.

4. A motor vehicle turn signal system comprising actuator means, indicator means, flasher means, said actuator means adapted to connect said indicator means to a source of D.C. voltage through said flasher means for intermittently energizing said indicator means, solenoid means adapted to disconnect said indicator means from said D.C. voltage source in response to energization thereof, time delay means adapted to be connected to a source of A.C. voltage by said actuator means, the frequency of said A.C. voltage being dependent on the speed of the vehicle, said time delay means including frequency responsive impedance means and heat dissipating means, bi-metal switching means responsive to the heat dissipated from said heat dissipating means for connecting said solenoid to said D.C. voltage source.

5. A motor vehicle turn signaling system in accordance with claim 4 in which said frequency responsive impedance means is a capacitor and said heat dissipating means is a resistor.

References Cited by the Examiner
UNITED STATES PATENTS 2,308,097   1/1943   Murray.
2,863,096   12/1958  Hollins _____ 340—81 X NEIL C. READ, *Primary Examiner.*

A. H. WARING, *Assistant Examiner.*